United States Patent [19]
Forge

[11] Patent Number: 4,583,156
[45] Date of Patent: Apr. 15, 1986

[54] SWITCHING MODE POWER SUPPLY USING SATURABLE REACTORS

[75] Inventor: Charles O. Forge, Los Altos, Calif.

[73] Assignee: Boschert Incorporated, Sunnyvale, Calif.

[21] Appl. No.: 538,608

[22] Filed: Oct. 3, 1983

[51] Int. Cl.[4] ............................................. H02P 13/22
[52] U.S. Cl. ........................................ 363/17; 363/98; 323/253
[58] Field of Search ...................... 363/17, 90, 91, 93, 363/98, 15, 82; 323/249, 251, 253, 329, 332, 335, 345

[56] References Cited

U.S. PATENT DOCUMENTS

| | | | |
|---|---|---|---|
| 2,721,304 | 10/1955 | Silver et al. | 323/251 |
| 2,765,436 | 10/1956 | Dornhoefer | 363/93 |
| 2,858,499 | 10/1958 | Silver | 363/79 |
| 2,880,374 | 3/1959 | Mulder | 363/91 |
| 3,004,210 | 10/1961 | Bennett et al. | 323/251 |
| 3,045,170 | 7/1962 | Howald | 363/82 |
| 4,343,034 | 8/1982 | Wells et al. | 363/90 |

FOREIGN PATENT DOCUMENTS

552020  11/1956  Belgium ................. 363/93

Primary Examiner—William H. Beha, Jr.
Assistant Examiner—Jeffrey Sterrett
Attorney, Agent, or Firm—Alan H. MacPherson; Richard Franklin; Steven F. Caserza

[57] ABSTRACT

A power supply uses first and second saturable reactor means connected to receive complementary first and second input voltages. The first saturable reactor means is disconnected from the first input voltage when the second saturable reactor means is connected to the second input voltage and vice versa. The power supply includes structure for sensing a variation in the power supply output voltage from a desired value and for producing a control signal in response thereto. A signal representative of volt-seconds, generated in a feedback path, is passed through both first and second saturable reactor means to adjust the flux in the particular saturable reactor means not connected to its input signal. This sets the initial flux in that saturable reactor means the next time it is connected to its input voltage. A change in the power to be supplied by the power supply causes a change in the time necessary to saturate each of the two saturable reactors. The two saturable reactors are connected and disconnected to their corresponding input voltages on a periodic basis. The system is capable of responding to changes in demand for this power within one-half period of switching between said first and second saturable reactors.

5 Claims, 28 Drawing Figures

SWITCHING MODE POWER SUPPLY USING SATURABLE REACTORS

FIELD OF THE INVENTION

This invention relates to power supplies and in particular to the utilization of magnetic amplifiers in a switching power supply so as to control the duty factor of the pulse-width modulated wave form within the power supply without the use of a pulse width modulator constructed using semiconductor components.

BACKGROUND OF THE INVENTION

Switching power supplies are well known. Such power supplies are described, for example, in U.S. Pat. No. 4,037,271 entitled "Switching Regulator Power Supply" and No. 4,061,931 entitled "Switching Regulator Power Supply Main Switching Transistor Turn Off, Speed Up Circuit" issued on inventions assigned to Boschert, Incorporated, the assignee of this application. In a switching power supply, the duty cycle of the internal wave form is determined by a feedback signal arranged so as to control the average (rectified) output voltage at a substantially constant level despite variations in line voltage and load current. Typically, prior art switching power supplies have used numerous active semiconductor components in the circuitry controlling this output voltage. While some switching power supplies have not used such components, those power supplies which do use such components are relatively expensive and sometimes exhibit sensitivity to noise. Indeed sometimes these power supplies are damaged by aberrational signals. Accordingly, it would be desirable to have a switching power supply which avoids even these rare instances of failure and at the same time is significantly less expensive to build.

SUMMARY

This invention provides structure which avoids the use of active semiconductor components in the portion of the circuitry determining the duty factor of the pulse-width modulated wave form within the power supply.

In accordance with this invention, the disadvantages of the prior art circuitry are overcome by employing saturable magnetic cores in the portion of the circuitry controlling the duty factor of the pulse-width modulated wave form used to drive the output rectifier and filter which supply the load with a controlled and regulated voltage or current. In one embodiment of this invention, two saturable magnetic cores are coupled together by a control winding through which a control current is passed. Two pairs of switches are provided to control the current passing through a second winding through each of the two saturable magnetic cores. When the first switch is closed such that current passes through the first saturable magnetic core, the second switch is opened thereby to prevent load current from passing through the second saturable magnetic core. The two switches operate in a complementary fashion so that when one switch is open the other switch is closed. At all times control current is passed through the control winding passing through both saturable magnetic cores. The rectified output current is passed through a third inductive element comprising a linear filter. This inductive element operates in a conventional mode so as to form an inductive filter with the power supply capacitor associated with this portion of the circuitry.

DETAILED DESCRIPTION

The following detailed description is intended to merely be illustrative of several embodiments of the invention but not limiting.

Figures 1, 2A, 2B:
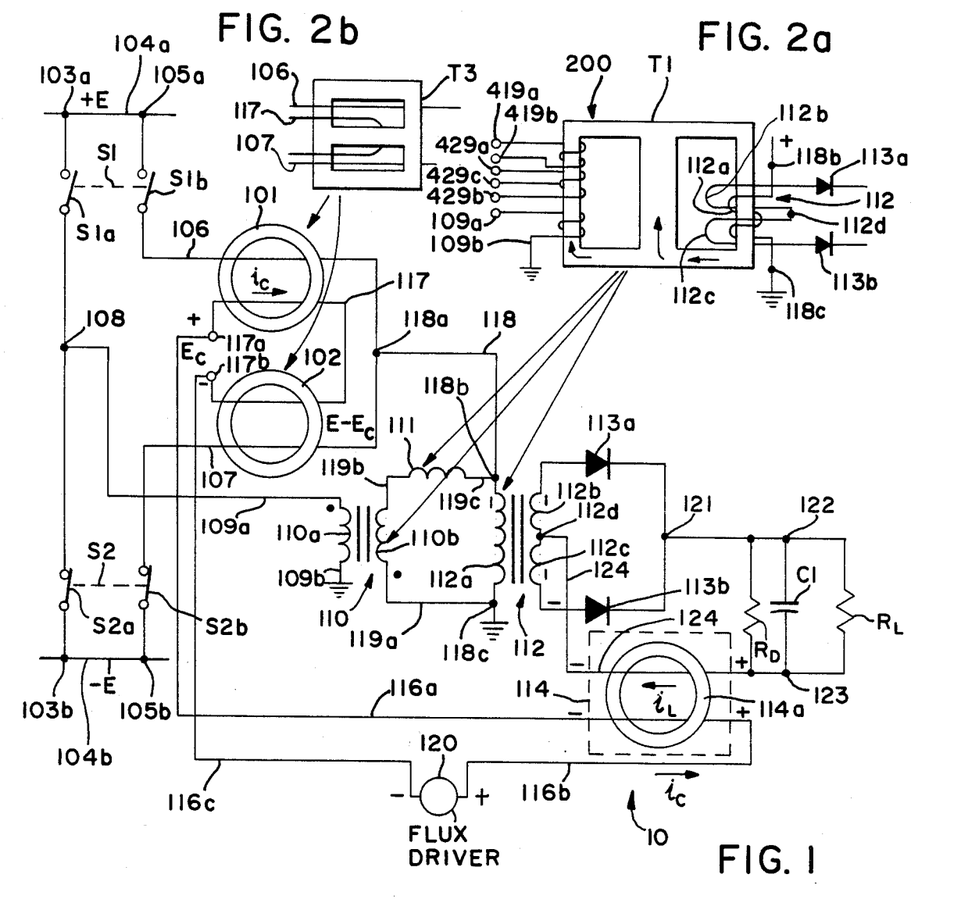
FIG. 1 illustrates schematically the structure of this invention.
FIG. 2a illustrates the composite structure comprising transformers 110 and 112 as shown in FIG. 1.
FIG. 2b illustrates the composite structure comprising cores 101 and 102 and associated windings in FIG. 1.

As shown in FIG. 1 the basic structure of this invention comprises a number of switches, leads and saturable magnetic cores (typically fabricated of a ferrite material such as TDK ferrite material H7C1 but also advantageously capable of being fabricated using a metallic core), transformers, inductors, diodes, capacitors and resistors. In FIG. 1, rectified DC input voltages of $+E$ and $-E$ are applied to nodes $103a$ and $103b$, respectively. The structure for obtaining voltages $+E$ and $-E$ is well known and thus will not be described in detail. Node $103a$ is connected by lead $104a$ to node $105a$. Switch S1 connected to nodes $103a$ and $105a$ drives the two switching elements S1$a$ and S1$b$. Switch S2 connected to nodes $103b$ and $105b$ drives the two switching elements S2$a$ and S2$b$. S1 and S2 are controlled such that S1 is always open when S2 is closed and vice versa. The two switches, as will be discussed in more detail later, each are opened and closed for one half of each cycle and operate in a complementary fashion. Switch S1$a$ is connected to node 108 as illustrated and switch S2$a$ is also connected to node 108. Node 108 is connected by means of lead $109a$ through the input winding $110a$ on transformer 110 and then through lead $109b$ to ground. Naturally, lead $109b$ could go to other than ground should switches S1 and S2 be on and off other than 50% of each cycle. However, in this situation S1 and S2 would still operate in a complementary manner to insure that the average voltage through the input winding 110a of transformer 110 would still be zero.

Saturable cores 101 and 102 (typically formed from ferrite) are arranged such that lead 106 connected to switch S1b passes through and thus influences the magnetic flux within core 101 while lead 107 connected to switch S2b and thus through switch S2b to the negative input voltage −E passes through and influences the flux in core 102. A control winding comprising lead 117 also is passed through the center of both core 101 and core 102. Lead 117 is driven by a voltage $E_c$ (the control voltage) applied to nodes 117a and 117b. The control voltage $E_c$ is derived by means of flux driver 120, a well known circuit described briefly below in conjunction with FIG. 4. The voltage $E_c$ is controlled not only by the voltage generated by flux driver 120, but also by the voltage generated on lead 116b by linear filter inductor 114. Inductor 114 comprises a core 114a (formed from a ferrite but with an air gap to have a lower magnetic permeability than the cores 101 and 102) together with the winding 124 passing through the core 114 from node 123 to node 112d. Thus inductor 114 acts as the output inductor in the output circuit from the power supply to the load $R_L$.

The output voltage on node 118a from cores 101 and 102 is applied by means of lead 118 to node 118b. Node 118b is connected to one terminal of the input winding 112a of transformer 112 and through inductor 111 to the terminal 119b connected to one side of the output winding 110b of transformer 110. The other ends of output winding 110b and input winding 112a are connected together at node 118c which is connected to ground or to the same reference voltage as lead 109b connected to input winding 110a. The output voltage on node 118a induces the voltage in the output windings 112b and 112c of the center tapped output winding of transformer 112. Transformer 112 comprises part of composite transformer T1 shown in FIG. 2a. Diodes 113a and 113b in conjunction with center tapped output windings 112b and 112c function as a full wave rectifier to provide a D.C. output voltage across capacitor C1 which drives the load $R_L$. Inductor 114 is in circuit relation with capacitor C1 so that the two function as a low pass filter in a well known manner.

Figure 3A:
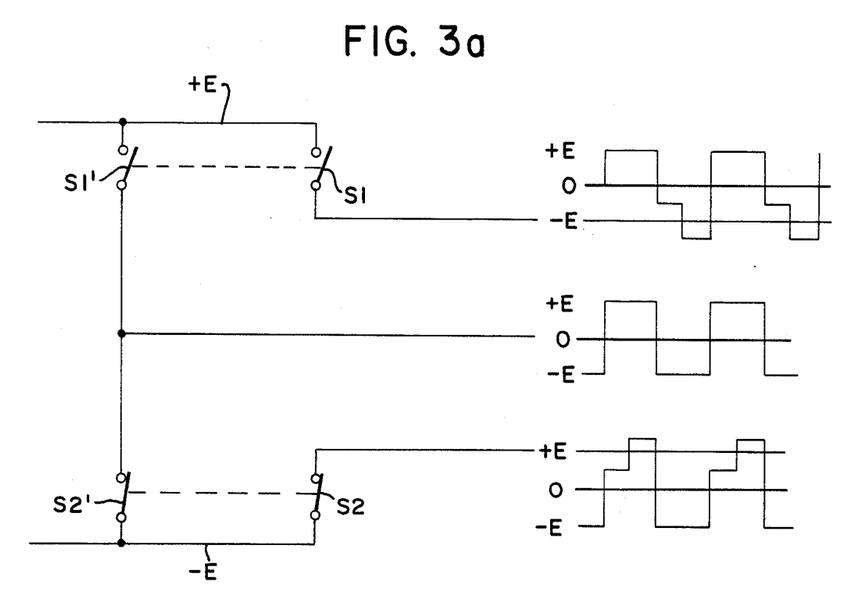
FIG. 3a illustrates four switches of use in this invention and one set of wave forms obtained using the structure of this invention.

The input waveform of this circuit is shown in FIG. 3a in conjunction with other waveforms of use in explaining the operation of this invention.

Leads 116a and 116b pass through core 114a of inductor 114 in such a manner as to generate a voltage in the circuit of which leads 116a and 116b are a part. Lead 116b is attached to the positive labeled node of flux driver 120 and to lead 116a through core 114a. Lead 116a is attached to lead 117 at node 117a. Lead 116c connects the negative labeled node of flux driver 120 to lead 117 at node 117b. This total circuit comprises a feedback path which is arranged to have an effect upon the duty factor of the modulator comprising cores 101 and 102 and the windings extending through these cores.

By convention, the number of passes of a lead through the opening of a core determines the number of turns around the core made by the lead. Thus, one pass of lead 106 through the opening in core 101 indicates that this lead is wound once around core 101. In an actual circuit, of course, lead 106 could be wound a plurality of times around core 101 depending upon the relationship desired between the current in lead 106 and the flux through core 101. This also holds for each of the other cores and windings passing therethrough in the figures of this specification. In the schematic of FIG. 1 each of the wires through each of the cores is drawn to indicate only one winding of each wire around each core. The relative number of windings used as shown in FIG. 1 yields one working embodiment of this invention. Of course, the number of windings through a core and the number of turns in a transformer can be varied throughout the circuit so long as these variations are compensated for in such a manner as to achieve the desired loop gain. One skilled in the art knows the relationship between the number of windings through a core and the number of turns in a transformer necessary to achieve a desired gain. The loop gain achieved with the structure shown in FIG. 1 is unity gain.

Figure 7A:
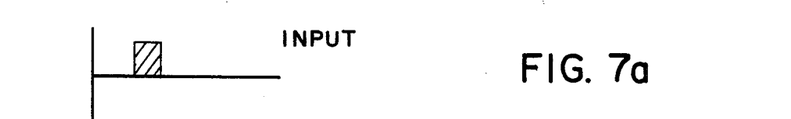
FIGS. 7a through 7d illustrate additional waveforms useful in explaining the operation of this invention.
Figure 7B:
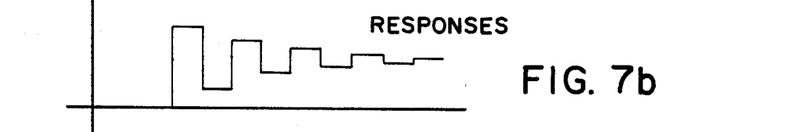
Figure 7C:
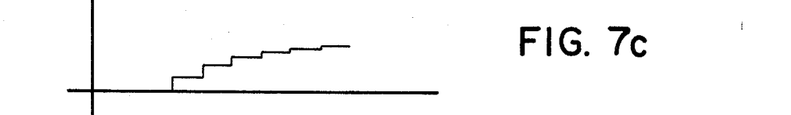
Figure 7D:
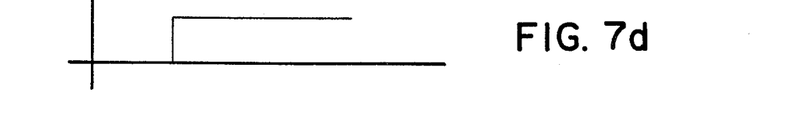

The circuit of FIG. 1 is optimized for one-half cycle response (that is, the response of the circuit to a change in the flux driver will take place within one-half cycle of switch S1 or switch S2 where one cycle is defined as the period during which switches S1 and S2 are both opened and closed). However, if desired, the gain can be increased, thereby to generate a damped oscillatory response of a type well known in control theory; or the gain can be reduced, thereby to generate an asymptotic, nonoscillatory response, again of a type well known. FIG. 7a shows a pulse input signal from flux driver 120 while FIGS. 7b, 7c and 7d illustrate a damped oscillatory overshoot response, an asymptotic nonoscillatory response, and a nonoscillatory unit step function response, respectively. The gain is controlled by controlling the ratio of secondary windings to primary windings in selected magnetic components. Increasing this ratio makes the response more oscillatory or moves the response toward an oscillatory response. The relative number of windings through the cores and turns in the transformer shown in FIG. 1 insure the proper relationship between components in the circuit and its operation. As explained above, the numeral 1 adjacent to input winding 112a and output windings 112b and 112c indicates that the relationship between these windings is also 1 to 1. Other turns numbers can be used if desired by one skilled in the art.

Ideally, under no load conditions, that is when $R_L$ is of extremely high impedance, the cores 101 and 102 will each never saturate and therefore the output voltage at node 118b would be zero.

The flux driver 120 and the current $i_L$ through output inductor 114a determine the volt-seconds which are present in winding 117 and hence the total flux in cores 101 and 102 at the start of each half-cycle when the input current $i_c$ from node 105a or 105b passes through one or the other of these two cores. The system is designed such that if the average value of $i_c$ is zero, the cores 101 and 102 will not saturate during the half-cycle the current is passing through each of these cores.

In operation when switch S1b is closed and S2b is open, a square wave voltage is applied to lead 106. FIG. 3a shows this voltage as a function of time. The winding 106 which makes one turn around core 101 generates an increasing flux in core 101 at a constant rate. Consequently, the current through winding 106 increases and thus the current at node 118b increases. Normally, if only input winding 112a were present in the input circuit to transformer 112, the voltage at node 118b would also increase reflecting the impedance of the output circuit of which input winding 112a is a part.

When the power supply load resistance $R_L$ becomes infinite (i.e., corresponding to an open circuit), the output current at node 122 will become zero. The current to node 118b on lead 118 will continue to flow, however, and therefore result in capacitor C1 charging to a level above the design limits of the circuit. Accordingly, oftentimes a resistor $R_D$ is placed in parallel with resistor $R_L$ and capacitor $C_1$ internal to the power supply to ensure that should $R_L$ become very large, a load current is still produced at node 122. This prevents capacitor $C_1$ from charging beyond the limits of the circuit.

In accordance with this invention a higher than desired voltage on node 118b is eliminated by providing inductor 111, which functions to balance current at node 118b, and transformer 110 which contains output winding 110b poled such that a positive voltage on lead 106 results in a negative voltage appearing on lead 119b. The current through inductor 111 resulting from the negative voltage on lead 119b balances out the current flowing into node 118b on lead 118 as a result of a positive voltage on lead 106. When the switch S1 is open and switch S2 is closed, the polarities of the rates of change of the currents flowing into and out of node 118b are just reversed. However, the result is still to keep node 118b at essentially zero volts.

As a feature of this invention, a unique transformer structure is provided. In theory, a transformer such as transformer 110 contains no inductance. Rather, the ratio of the voltage applied across the primary to the voltage output at the secondary and the ratio of the current through the secondary to the current through the primary are determined by the ratio of the turns of the windings on the primary to the turns of the windings on the secondary and the polarity of these two windings. In practice, however, there is an inductance associated with the transformer. Inductor 111 is obtained in accordance with this invention through the novel structure shown pictorially and schematically in FIG. 2a wherein leads 109a and 109b are wound around the primary of the transformer while leads 419a and 419b and 429a, 429b and 429c are functioning in a manner to be described shortly in conjunction with the description of FIG. 4. Primary winding 112a is shown magnetically closely coupled to secondary windings 112b, 112c. The internal characteristics of the structure T1 shown in FIG. 2a provide an inductance which corresponds to the inductance 111 shown in FIG. 1.

Figure 8A:
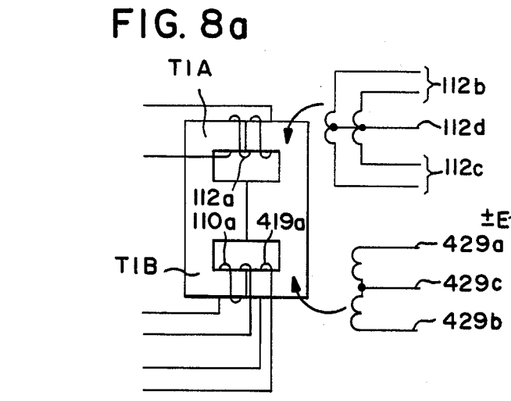
FIGS. 8a through 8c illustrate the windings of transformers employed in the embodiments of this invention.
Figure 8B:
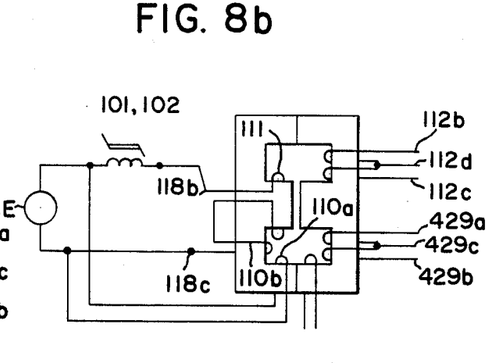
Figure 8C:
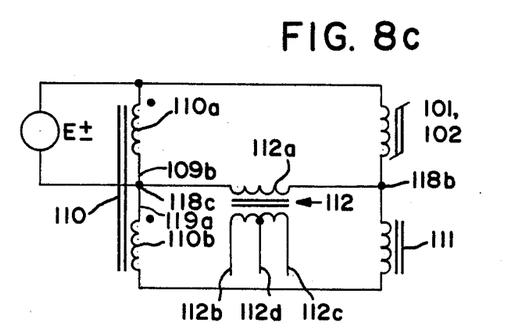

FIGS. 8a, 8b and 8c, which will be described below, illustrate the equivalent circuits which show the relationship between the structure of transformer $T_1$ shown in FIG. 2a and the circuit windings shown in FIG. 1 associated with magnetic structure $T_1$. FIGS. 8a through 8c illustrate how inductor 111 and secondary 110b become merged into the inherent structure of transformer $T_1$ and do not require physical windings for their realization. In FIG. 1, the current ramp at node 118b is determined by the integral of the voltage $+E$ through the equivalent inductance of core 101 in parallel with core 102 in the configuration shown. The object is to ensure zero voltage on node 118b despite this increase in current. This is done by creating a voltage proportional to E on the output secondary winding 110b of transformer 110 which will absorb at node 118b a current equal to the current put into that node by the input voltage E acting on cores 101 and 102. Inductor 111 thus produces an output current at node 118b equal to the current into this node but opposite in sign to this current. The inductance of inductor 111 is determined by the winding ratio of the windings on the primary 110a to the windings on the secondary 110b of transformer 110. If these windings have a unity ratio, then the inductance of inductor 111 will be equal in magnitude to the equivalent inductances of cores 101 and 102 as seen by the voltage $+E$. If the turns ratio of the primary to the secondary is number N, then the inductance of inductor 111 would be L over N where L is the equivalent inductance of cores 101 and 102. Inductor 111 has an inductance $L_{111}$ (where the symbol L represents inductance) which is equivalent to the inductance of magnetic structure $T_1$. Magnetic structure $T_1$ (FIG. 2a) is equivalent to transformers 110 and 112 and inductor 111 shown in FIGS. 1 and 8c. In obtaining a circuit which functions in accordance with this invention to yield a net current of zero at node 118b when cores 101 and 102 are nonsaturated, the input voltage E when switch S1 is closed and S2 is open is given by $$+E = (L_{equiv\ 101,\ 102})\, di_{106}/dt \qquad (1)$$

where $L_{equiv\ 101,\ 102}$ is the equivalent inductance of cores 101 and 102, and $i_{106}$ is the current through lead 106 with switch S1 closed and S2 open.

Thus $$i_{106} = (1/L_{equiv\ 101,\ 102}) \int +E\,dt \qquad (2)$$

To have zero net current from node 118b to node 118c, $i_{111}$ must equal $(-i_{106})$. Therefore, $$i_{111} = -(1/L_{equiv\ 101,102}) \int +E\,dt = (1/L_{equiv T1}) \int E_{119b}\,dt \qquad (3)$$

Where $L_{equiv T1}$ is the inductance of magnetic structure T1 and $E_{119b}$ is the voltage induced on lead 119b.

Thus $$L_{111} = L_{equiv\ T1} = (L_{equiv\ 101,102}) E_{119b}/+E \qquad (4)$$

This inductance of magnetic structure $T_1$ and its utilization as part of this invention will be described below in greater detail in conjunction with the description of FIG. 4.

Output winding 110b is driven by a signal on input lead 109a connected to node 108 which is connected through switch S1a to the positive input signal $+E$. Thus the closing of switch S1 simultaneously closes switches S1a and S1b to achieve the balancing out of rising current on lead 118 and thus the balancing out of voltage and current at node 118b. That is, the current $i_{111}$ through inductor 111 and the secondary 110b of transformer 110 just equals the current $i_{106}$ into node 118b on lead 118. Accordingly, the voltage on node 118b remains small and close to the reference voltage on node 118c because no current is available to pass through winding 112a on the primary of transformer 112. This is independent of the line voltage $+E$ or $-E$. Thus, by properly sizing the turns ratio of transformer 110 and the size of inductor 111, the voltage on node 118b can be held to zero while the flux through core 101 or core 102 is increasing.

Because the current through the secondary 110b does not exactly equal the current on lead 118, a small residual current flows through the primary winding 112a of transformer 112. This generates an output current through the secondary winding which charges capacitor $C_1$. Accordingly, resistor $R_D$ in parallel with capacitor $C_1$ ensures that capacitor $C_1$ does not charge above its limits in the absence of load $R_L$. The power wasted through parallel resistor $R_D$ is much smaller in this invention than in the prior art because only the residual current through primary 112a must be compensated for by the presence of $R_D$ in the absence of a load $R_L$. The requirement on the circuit is that the product of the residual current through the primary 112a and the resistor $R_D$ be less than the rated output voltage of the circuit so that core 101 or 102 will be forced to saturate on the appropriate part of the cycle even with no load $R_L$ thus to maintain the system in control.

If the load $R_L$ is a reasonable load impedance, the time necessary to saturate either core 101 or core 102 will be finite. Thus with a reasonable load $R_L$ within every cycle of opening and closing of switches S1 and S2, core 101 and core 102 will saturate at a point before the completion of the cycle. The time in each cycle at which the saturation occurs is, among other things, a function of the load $R_L$. This time occurs earlier in each half cycle as $R_L$ decreases in value. Because of action of the error amplifier 604 (FIG. 4) acting on the flux driver 120, the point at which saturation occurs is a function of the input voltage, the signal from the flux driver 120 and the output voltage across capacitor $C_1$.

The key to the operation of the circuit shown in FIG. 1 is the fact that the current $i_c$ through lead 117 which passes through cores 101 and 102 represents the history of operation of the circuit. This current biases the total of the flux in both core 101 and core 102 to a given value thereby reducing the time necessary to have the flux through core 101 or core 102 reach saturation. The winding of lead 117 around cores 101 and 102 is such that the greater the current $i_c$ through lead 117, the less the time necessary for core 101 and core 102 to reach saturation during the respective times that currents are flowing through leads 106 and 107. Thus lead 117 functions as part of the feedback circuit including inductor 114, leads 116a, 116b and 116c and flux driver 120. No load current, or current related to the load current, flows through lead 117.

During one-half of each cycle, switch S1 is closed and switch S2 is open. For so long as core 101 is not saturated a substantially constant voltage $+E$ is applied across node 105a to node 118a. When core 101 is saturated, the voltage $+E$ no longer appears across core 101 but rather is applied across the primary winding 112a of transformer 112. With switch S1 closed, all of the voltage $E_c$ appears across core 102 because the impedance seen by winding 117 across core 101 is substantially zero whether or not core 101 is saturated. This occurs because the impedance seen by winding 117 across core 102 is very large relative to the impedance seen by winding 117 across core 101 when switch S1 is closed and switch S2 is open. Naturally, when switch S1 is open and switch S2 is closed the situation is reversed. This insures that core 101 is not influenced by the voltage $E_c$ applied across nodes 117a and 117b during the part of the cycle when switch S1 is closed. Any voltage $E_c$ applied across core 102 is superimposed on the voltage $+E$ transformed from primary winding 106 by core 101 to winding 117 acting as a secondary in core 101 and a primary in core 102 to generate the voltage $+E$ across core 102 from node 118a to lead 107. Superimposed on this voltage $+E$ is any voltage $-E_c$ applied across core 102 from nodes 117b to 117a. Thus the net voltage applied across core 102 with switch S1 closed and core 101 not saturated is $(E-E_c)$. When core 101 becomes saturated, this voltage becomes $-E_c$ because the input voltage E no longer is applied across core 101 or 102. The time necessary to saturate core 101 is determined by the value of $i_c$ at the time switch S1 is initially closed. This circuit is analogous to a sample and hold circuit where the initial flux in core 101 is determined by the value of $i_c$ at the time switch S1b closes and the time necessary to saturate core 101 is determined by the voltage across nodes 105a and 118a, and not by further changes in $E_c$. Again, the reason that $E_c$ has no effect upon the flux through core 101 once switch S1b closes is that the impedance seen by lead 117 across core 101 is very low and across core 102 is very high. Naturally, this situation is reversed when switch S2 is closed and switch S1 is open. During the time that switch S1 is closed the current $i_c$ is setting the initial flux through core 102 for the next half cycle when S1 opens and switch S2 closes. During the time switch S1 is closed, the voltage changes across nodes 117a and 117b combined with the induced voltage in core 102 caused by the voltage generated on line 117 acting as a secondary in core 101 are essentially integrated and result in a flux change in core 102 from the flux through this core at time switch S1 was closed. Thus at the time switch S2 is closed and switch S1 is opened for the next half cycle, the initial flux through core 102 reflects the integral of the voltage $E-E_c$ during the previous half cycle when switch S1 was closed and switch S2 was open plus initial flux at the beginning of the previous half cycle which is always saturated.

The feedback loop comprising inductor 114, leads 116a, 116b and 116c, flux driver 120, the nodes 117a, 117b and lead 117 (all shown in FIG. 1) is central to the operation of this invention. When switch S1 opens (and also when switch S2 opens), the current from node 121 which passes through the parallel-connected capacitor C1 and load resistor $R_L$ connected in series with the inductor 114 to node 112d is at its maximum value. The volt-seconds in inductor 114 are also at their maximum value at that time. Leads 116a and 116c are connected to provide negative feedback such that when the volt seconds of inductor 114 are maximum, the volt seconds of $E_c$ are minimum. The volt seconds of $E_c$ (i.e., the time integral of $E_c$) determine the time to saturation of the next half cycle which, in turn, determines the duty factor of the next half cycle. The duty factor is defined as the fraction of the cycle time the input signal to the output filter (comprising capacitor C1 and the inductor 114) is high for any one cycle. The turns ratios and windings of the circuit (transformer 112 and saturable reactors 101, 102 and inductor 114) are selected for loop stability. In steady state the volt seconds output at $E_c$ across nodes 117a and 117b have the same value in relation to either core 101 or core 102 so that the time to saturation of these two cores is the same. The circuit operates in a repeatable fashion from cycle to cycle in steady state.

In the well-known Buck regulator, in steady state the ratio of the output voltage (taken across the equivalent of nodes 122 and 123 in the circuit of FIG. 1) to the input voltage (taken across the equivalent of either one of nodes 103a or 103b to node 118c in the circuit of FIG.

1) is equal to the duty factor. The output load ($R_L$) is in parallel with a capacitor (C1) which is part of an output filter to provide a steady-state voltage to the load. should the load ($R_L$) change in magnitude suddenly, the change in current is supplied by the capacitor. However, the current that must be added to the capacitor during each cycle to match the current being taken from the capacitor during that cycle, must change. In the classical Buck regulator this is done by changing the volt seconds through an inductor in the output filter by using transistor switches to modulate the duty cycle. Ideally, this change in volt seconds through the inductor in the output filter should occur in one cycle of signal.

This invention implements a regulator using magnetic cores rather than transistor switches as in the Buck regulator to provide the change in duty cycle required to compensate the current to the capacitor and the output filter for changes in the load so that the current to the load matches the current into the output filter. This invention achieves that result by a structure which ensures that the output current from the output filter responds to the time-integral of the voltage from the flux driver 120 within one-half cycle of the operation of switches S1 and S2. Flux driver 120 operates in a well known manner to derive a voltage from nodes 122 and 123 across output capacitor C1 which is then used to correct the current supplied to capacitor C1 to maintain the input current to capacitor C1 in balance with the output current from capacitor C1.

If a signal representative of volt seconds is supplied to the circuit through flux driver 120, this signal will be instantaneously applied across nodes 117a and 117b and will affect whichever of cores 101 and 102 has the high impedance. Thus when switch S1b is closed, the high impedance is sensed with respect to core 102 because switch S2 is open. When switch S1 is open and switch S2 is closed the high impedance is sensed through core 101. Thus the signal added to the feedback loop by flux driver 120 affects that core connected to whichever of switches S1 or S2 is open. Volt seconds can be pumped into the circuit through flux driver 120 in less than one half cycle to affect the next half cycle of operation of this circuit. In operation if volt seconds are added by flux driver 120 to the feedback circuit such as to increase the duty factor (i.e., the fraction of each half cycle that current flows across primary 112a), then the core (either core 101 or 102) connected through a winding to an open switch (either S1 or S2) will have its flux increased so as to decrease the time necessary to bring that core to saturation at the next half cycle. Likewise, should volt seconds be introduced so as to decrease the duty factor (also sometimes called the "duty cycle"), again the core which is not connected through a winding to a closed switch will have its flux changed so as to increase the time necessary to bring that core to saturation during the next half cycle when the switch connecting the winding through that core is closed. Because the capacitor C1 will not change voltage immediately, substantially all the volt seconds placed in either core 101 or 102 by the flux driver appear in the next half cycle across inductor 114. The time integral of the voltage generated from lead 116a to lead 116b then causes the volt seconds across nodes 117a and 117b to drop back to the previous value. However, the output current is increased because the volt seconds stored in inductor 114 are now higher. Thus the power supply has now stablized within one-half cycle at the new output current desired to reflect the new input from the flux driver. The duty cycle however returns to its original value. In effect, the lag effects of a normal inductor have been removed from the feedback loop. Normally an LCR resonance occurs in the feedback loop with a two pole peak thereby creating potential instabilities. The circuit of this invention essentially removes the lag in transient response caused by the inductor. By obtaining a single cycle response to unbalances or changes in the output signal of flux driver 120, the two pole output filter of the prior art is converted using saturable cores 101 and 102 into a single pole stable system.

Flux driver 120 uses circuitry well known in the prior art which measures the voltage across capacitor C1 and particularly across nodes 122 and 123 and provides a signal to change the operating current to maintain the desired voltage across nodes 122 and 123. Flux driver 120 used in one embodiment of this invention is described below in conjunction with FIG. 4.

The cores 101 and 102 shown in FIG. 1 of the invention are actually wound on what is called an "E Core" where the designation "E" is selected to reflect the configuration of the physical structure of the core. In one embodiment, the E core includes the T3 reactor (FIGS. 1, 2b and 10) comprising the cores 101 and 102 plus a sense winding 617 not shown in FIG. 1 but shown in FIGS. 4 and 10 comprising 28 turns on T3 (used to sense flux in flux driver 120) plus a control winding comprising 28 turns on T3 representing winding 117 in FIG. 1. This last winding comprises a bifilar winding with the feedback sense winding 617. Sense winding 617 samples the volt seconds associated with core 101 or 102. Sense winding 618 is in series with sense winding 617. These two sense windings provide a signal representing the total volt-seconds through inductor 114a and cores 101 and 102.

A bifilar coil is the winding of two separate coils around a magnetic core, simultaneously such that each winding has the same number of turns but is insulated from the other winding.

While one embodiment of this invention has been shown above in conjunction with FIG. 1, FIG. 4 shows another embodiment of this invention combining structure equivalent to that shown in FIG. 1 with flux driver circuitry 120. The embodiment of FIG. 4 includes a rectifier and filter 200 of well-known design, an inverter 300, an internal power supply 400, a rectifier, filter and power transformer 500, and, a control section 600 which includes flux driver 120 and an error amplifier 604, a reference voltage source 605 and the winding of lead 117 coupling the flux driver into the saturable reactor T3 which is part of rectifier, filter and power transformer 500 and which was shown in FIG. 1 as including cores 101 and 102.

Figure 3B:
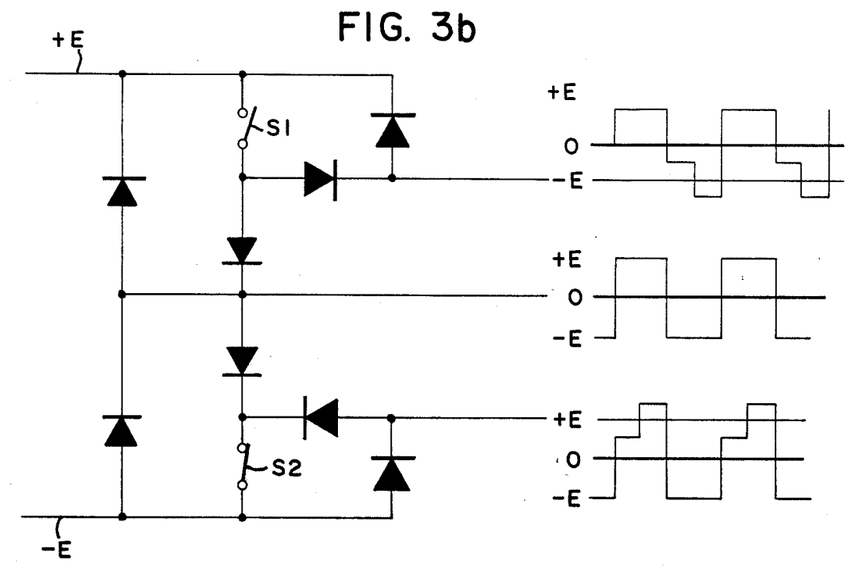
FIG. 3b illustrates an alternative structure to that of FIG. 3a wherein four switches as shown in FIG. 3a are reduced to two switches as shown in FIG. 3b together with a number of diodes.
Figures 4, 12:
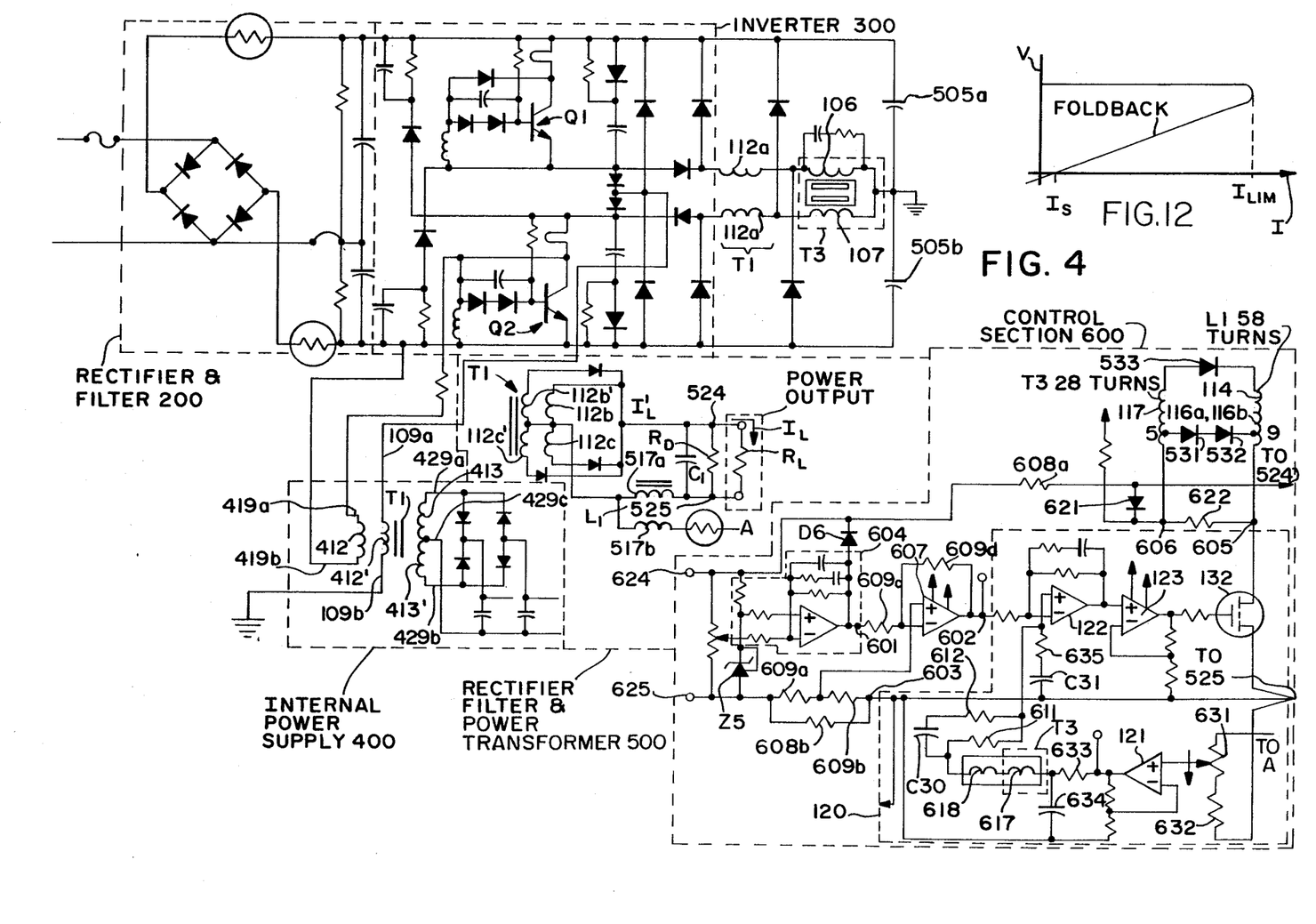
FIG. 4 illustrates schematically the circuit of one embodiment of this invention.
FIG. 12 illustrates the folded-back voltage versus current characteristic of the power supply obtained through the use of diode 106 as shown in FIG. 4.

FIG. 4 shows the saturable reactors corresponding to cores 101 and 102 of FIG. 1 together with the control winding 117 and a flux sense winding 617. These three components are labeled T3 in FIG. 4 and are wound on the core shown as FIG. 2b. Thus physically these elements are formed as part of the same structure but schematically in FIG. 4 these elements are shown at separate locations in the circuit representative of the parts of the circuit in which they function. Likewise, the transformer T1 shown in FIG. 2a as being formed on an E-core and comprising parts of transformers 110 and 112 shown in FIG. 1 is shown as being formed in inverter 300, internal power supply 400 and in rectifier, filter and power transformer 500, and includes the 4 sets of windings shown in rectifier filter and power transformer 500 comprising windings 112b, 112c and 112b' and 112c'. Parallel windings are used to overcome size limitations on physical components. Again, these windings form part of a single structure but are shown in FIG. 4 to be separately located thereby to more accurately depict the portions of the circuit in which they function. Of course, transformer T1 also has additional windings, such as windings 412 and 412', and 413 and 413' used in internal power supply 400 used within the power supply and as a part of the primary 112a of the output power transformer, the secondary of which is shown as comprising windings 112b, 112b', 112c and 112c'. Secondary 412 also provides a square wave to the inverter 300 of FIG. 4. Inverter 300 is shown in more detail in FIG. 11 and replaces the switches S1 and S2 of FIG. 3b.

Finally, inductor L1 comprising inductor 114 and associated windings of FIG. 1 is shown in FIG. 4 as three components comprising windings 517a, 517b in rectifier, filter and power transformer 500, winding 618 in flux driver 120 and winding 116a, 116b in the control section 600.

Winding 116a, 116b is shown in FIG. 4 as part of L1. L1 contains a number of windings including a unity coupled sense winding 517b that uses the series resistance of the main winding 517a as a current sense resistor.

Power supply 400 is for internal use within the switching power supply. Supply 400 is unregulated and the power to drive supply 400 comes directly off the square wave associated with switches S1 and S2 (see FIGS. 3a and 3b).

Some of the output power on terminal 524 is transmitted through diode 621 through the 28 turn winding 117 on T3 and then through the 58 turn winding 116ia, 116b on L1 and through MOS driver transistor 132 to the return stud 525 of the power supply (corresponding to node 123 in FIG. 1).

Before the switcing power supply of FIG. 4 comes up into operation, there is no output voltage across $R_L$. Because of that, no current is available to drive windings 116a, 116b and 117. Therefore, absent some other source of power, the duty cycle of the power supply would remain zero. To provide start-up power, a 10-volt signal is derived from the internal power supply 400 and is applied to the cathode of diode 621.

A user of the power supply of this invention has the option of connecting the +5 volt sense 624 and return sense 625 either to the studs 524 and 525 to which the load being powered is connected or to the user's end of the cable connected to studs 524 and 525 so that any voltage drop through the cable (typically a fraction of a volt) will be taken into account to obtain at the customer's equipment an accurate 5-volt signal.

Within the control section 600 of the switching power supply is an error amplifier 604 which compares a fraction of the output voltage with a reference voltage set by the adjustable zener diode Z5. Error amplifier 604 comprises in a well-known manner, an operational amplifier and a band gap reference of a type known as the TL 431 obtainable, for example, from TI or Motorola.

At node 601 there can exist any voltage possible between 0 and 5 volts (note that diode D will prevent this node from going above 5.7 volts). Between nodes 601 and 602 is placed an inverting differential operational amplifier 607 having unity gain. Thus the voltage on node 601 is inverted and appears with the same amplitude but opposite sign on node 602.

The current $I_L'$ from the power supply (shown as $I_L'$ in FIG. 4) is controlled by the voltage $E_{control}$ which is generated at node 601 in the control section 600. The current $I_L'$ is related to the voltage $E_{control}$ by the equation $$I_L' = g_m \times E_{control}$$

In a typical power supply $g_m$, the transconductance, has an amplitude of approximately 20 amps per volt. $I_L'$ follows the control voltage $E_{control}$ in one cycle. However, several cycles are often required before the load current $I_L$ through resistor $R_L$ assumes the correct value.

As the voltage on the power output pins 524, 525 decreases slightly because of increased demand for the current $I_L$ caused by a decrease in the value of $R_L$, $E_{control}$ will increase and cause the load current $I_L'$ to increase and eventually equal the current $I_L$. At some point, the load current $I_L$ reaches the design limit of the power supply. When this happens, diode D (current limit foldback diode) in the control section turns on and clamps $E_{control}$ to a fixed voltage above the voltage on pin 624. Consequently, further decreases in load impedance result in decreases in the output voltage rather than increases in load current $I_L$. As the output voltage across $R_L$ drops, the voltage on pins 524 and 624 and thus the voltage at node 601 drops to follow the output voltage across $R_L$. Diode D (current limit and foldback diode) ensures that the voltage on node 101 tracks the dropping voltage across the load. Consequently, the load current falls and results in what is called "current foldback". This is shown in FIG. 12. In FIG. 12 the current $I_s$ represents the short circuit current wherein $R_L$ goes to zero and $I_{lim}$ represents the limiting current which is the maximum current capable of being produced by the power supply. Ultimately, if the load impedance drops to zero, the current provided by the control section 600 drops close to zero. The behavior of the current control section in response to a drop in the output voltage across the load resistor $R_L$ at the power output 524, 525 can be tailored to be limited or to fold forward or even to control the shape of the current as a function of the output voltage.

Resistor 608a in the 5 volt power supply line of control section 600 having terminal 624, which can be connected to either stud 524 or to the positive supply at the user's terminal, insures that should the user not connect to terminal 624 there is adequate supply voltage at the inputs to error amplifier 604 for the control section to operate. Thus, if the user neglects the connect 624 to his equipment, resistor 608a is low enough in value to insure that the voltage at the input to error amplifier 604 is almost exactly the power supply output voltage. Should the user connect terminal 624 to the positive voltage input on his equipment, resistor 608a is high enough in value relative to the impedance of the user's sense line to prevent errors in the sense line. Resistor 608b does the same thing in the return lead as does resistor 608a in the sense lead.

The 2.7K resistors 609a, 609b, together with 2.7K resistors 609c and 609d shown attached to the inverting and output leads of differential amplifier 607 provide a unity gain inverting differential amplifier of a standard well-known configuration in circuit design. The output current $I_L'$ is controlled by the voltage on the node 102, which is the voltage on node 601 inverted.

The output signal from the differential amplifier 607 on node 602 is transmitted to the flux driving circuit comprising two differential operational amplifiers 122, 123, together with an MOS power amplifier 132 (a field effect transistor) which operates in an analog mode. The MOS field effect transistor 132 produes an analog output signal proportional to the gate voltage applied to it by the differential amplifier 123 connected to its gate. The analog power amplifier 132 is taken together with the feedback loop shown in FIG. 10 to provide a low impedance voltage source which is then used to provide the "V-drive" signal shown in FIG. 10. The V-drive signal is applied from node 605 to node 606 (FIGS. 4 and 10) and is proportional to the first time derivative of the signal on node 602.

Figure 10:
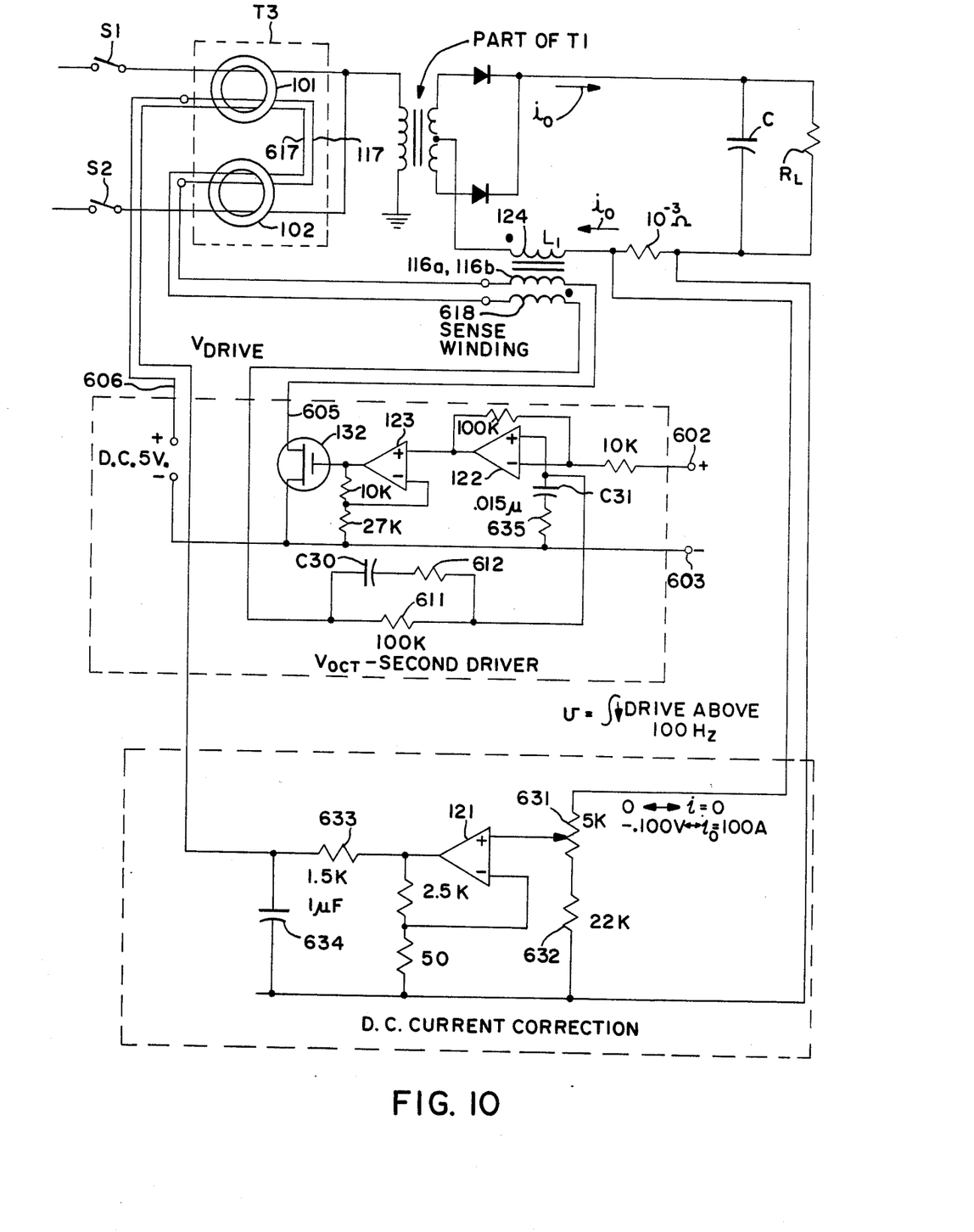
FIG. 10 shows one embodiment of control section 600 in FIG. 4.

In FIG. 10, the roles of the bifilar drive and flux sense windings on both L1 and T3 are shown more clearly. The advantage of separate drive and sense circuits is that induced voltage is sensed in a circuit unaffected by extraneous voltage drops caused by relatively high drive currents acting on stray impedances in the drive circuit and also the number of turns in the drive circuit can be varied during operation without affecting the relationship between total flux and the voltage on node 602 (FIGS. 4 and 10).

The circuit is a high loop gain feedback configuration which acts so as to force the volt second integral sensed to balance the input voltage on node 602. The integral is formed by the RC integrator 611 and C 31 (FIGS. 4 and 10) acting on the sense windings of L1 and T3. To avoid a potential problem in defining the constant of integration, which affects the DC relationship between voltage on node 602 and $I_L'$, a low bandwidth amplifier using operational amplifier 121 senses the DC value of $I_L'$ and substitutes this signal for the integral in the case of control signals below 100 Hz in frequency, down to DC.

The DC value of $I_L'$ is sensed as a voltage drop across the main winding of L1 using a bifilar sense connection to cancel any AC voltage across L1 and sense only the current. This is applied to operational amplifier 121 through resistors 631 (5K ohms) and 632 (22K ohms). Resistor 631 is adjustable to compensate for tolerances in winding resistance in L1. A temperature sensitive resistor is used to compensate for the variation of winding resistance with temperature.

The filter comprising resistor 633 (1.5K ohms) and capacitor 634 (1 microfarad) provides a 100 Hz low-pass filter for this signal.

This circuit not only forces the volt second integral of $V_{drive}$ to follow node 602 voltage, but it also provides a low output impedance up to a frequency of approximately 1 MHz to prevent ripple voltage from existing on the $V_{drive}$ signal due to exciting currents of the reactor T3. Such ripple voltages would reduce the voltage dynamic range of drive amplifier 132 and thus increase the required power dissipation in drive amplifier 132.

The drive circuit of FIG. 4 is similar to the basic circuit of FIG. 10. One addition in FIG. 4 is diodes 531, 532, 533 and the taps 5 (at 10% of T3 turns) and 9 (at 10% of L1 turns). These function as a "tap changer" which decreases the effective number of drive turns in cores 101 and 102 and reactor 114 (FIG. 1) at high instantaneous values of $V_{drive}$. This allows high volts per turn driver amplitudes for fast transient slew rates without the penalty of high drive current during the majority of the time when $V_{drive}$ is low.

The integrator in the feedback path comprises resistor 611 of 100K and capacitor C31 of 0.015 microfarad as shown. The resistor 635 of 1K ohms connected between the capacitor C31 and the noninverting input lead of the flux driver amplifier 122 increases the loop gain at a high frequency by preventing the serial impedance of the capacitor C31 in conjunction with the 1K resistor 635 from dropping beneath 1K ohm at high frequencies. Capacitor C30 in the flux driver feedback path in parallel with resistor 611 (100K), decreases the impedance of the parallel combination of the 100K resistor 611 and capacitor C30 as the frequency increases. This gives a lower output impedance at high frequency (for example up to 1 megahertz).

Figure 11:
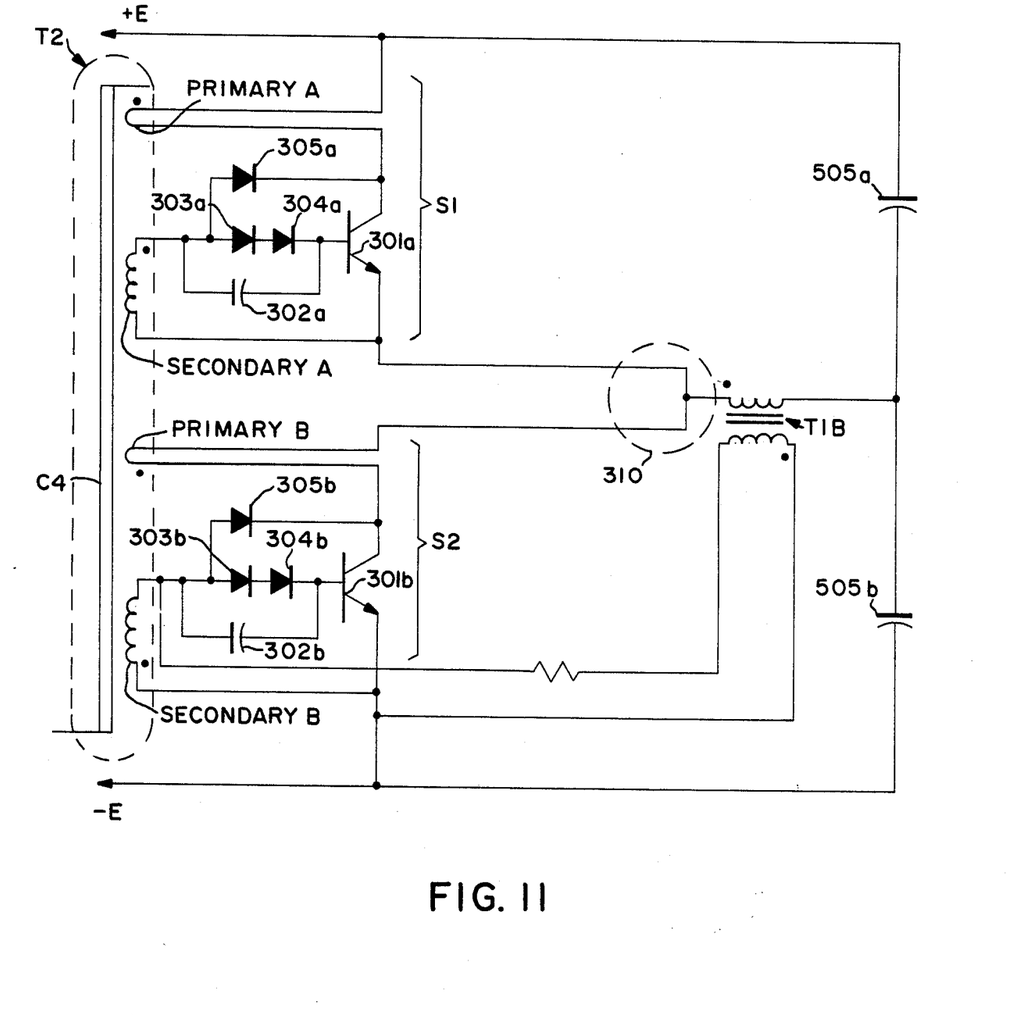
FIG. 11 illustrates the inverter 300 shown in FIG. 4.

The transformer shown in FIG. 8a is novel. This transformer is manufactured using standard winding techniques, but the important fact is that one particular E-core serves as the core for the power transformer, for the auxiliary supply transformer, and for the half bridge inverter (comprising the two transistors Q1 and Q2 and the two capacitors 505a and 505b shown in FIG. 4) as also shown in FIG. 11.

FIGS. 8a, 8b and 8c illustrate the structure (FIG. 8a), the conceptual arrangement of the windings on the structure shown in FIG. 8a (FIG. 8b), and the balanced circuit achieved by the structure of FIG. 8a and the conceptual windings of FIG. 8b (FIG. 8c). The windings of FIG. 1 which correspond to the various windings shown in FIG. 8c are numbered in FIG. 8c by the numbers given to these windings in FIG. 1. While the structures shown in FIGS. 8a, 8b and 8c are particularly related to the structure shown in FIG. 1, taps 429a, 429b and 429c correspond to the T1 winding shown in the internal power supply 400 in FIG. 4. The way in which the structure of 8a achieves the circuit schematic of FIG. 8c is by making use of the intermediate but equivalent structure of FIG. 8b. Omitted from the structure of FIG. 8a are the saturable reactors 101 and 102 shown in FIGS. 8b and 8c as well as the switching souce of a voltage supply +/−E. FIG. 8c represents a drawing of the balanced saturable reactor and transformer structures shown in FIG. 1.

Figure 5:
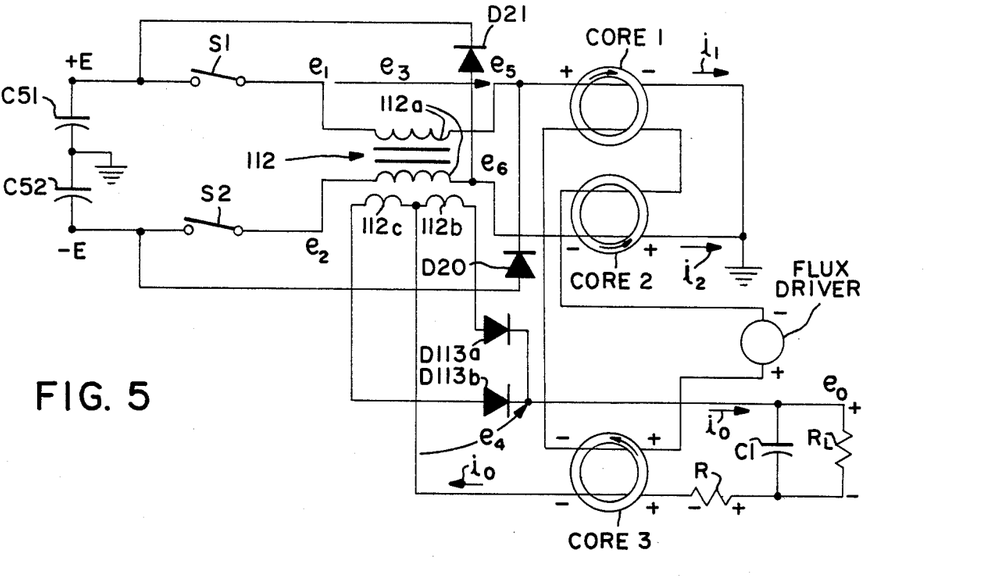
FIG. 5 illustrates schematically a portion of the structure of FIG. 4.

FIG. 5 illustrates an energy saving embodiment of this invention. In the structure of FIG. 5 the transformer 112 is placed in front of the saturable reactors, contrary to the structure shown in FIG. 1. The reason for this construction is that the saturable reactors have a high $LI^2$ factor after they are saturated. Thus, a significant amount of energy is stored in the magnetic fields associated with the windings of the cores. Typically, this energy, if dissipated every cycle, is about 50 watts in a 500 watt power supply. Thus, this power would have to be thrown away should the energy be dissipated in a resistor. This energy is put back into the supply through a "catch" diode D20 (FIG. 5), and the corresponding diode D21 as shown in FIG. 5. In the structure of FIG. 5, when switch S1 opens, the current $i_1$ flowing through core 1 from node e5 drives node e5 negative, relative to the anode of diode D20, thereby forcing diode D20 to conduct. Consequently, this current is applied to the storage capacitor C52 connected to the −E input and the energy is transferred from core 1 through which the current $i_1$ passes to the input capacitor C52. Correspondingly, when switch S2 opens and S1 closes, the current $-i_2$ through core 2 drives node e6 more positive and turns on diode D21, thereby to charge capacitor C51 associated with the +E input terminal. Consequently, the energy stored in each of the cores before the switch point is stored on one of the two capacitors C51 or C52 driving the power supply thereby to conserve energy. The placing of the reactors or cores 1 and 2 to the right of the transformer so that this current passes back to the supply and is therefore conserved, is a feature of this invention. To do this, the transformer 112 (FIG. 5) needs two bifilar windings so that $i_1$ can only come from switch 1 and $i_2$ can only come from switch 2. This is a requirement of the reactors 1 and 2 for proper operation.

The waveforms of FIGS. 6a through 6d and 9a through 9g explain the operation of the circuit of FIG. 5. During the time switch S1 is on, the voltage on node e1 is $+E$; and during the time switch S2 is on, the voltage on node e2 is $-E$. During the time, however, that switch S1 is turned off, the voltage on node e5 would, if there was no voltage on the control windings through the two saturable cores, go to $-E$. However, there is voltage on the control windings from core 3. On this control winding is the output voltage $+E_0$ across the output impedance $R_L$. So instead, the voltage on node e1 goes up to $-(E-e_0)$ which is a voltage closer to zero as shown. The voltage stays at that level until the core saturates, at which time it drops very rapidly to $-(2E-e_0)$. Thus, if $e_0$ is zero, the voltage on node e1 goes to $-2E$.

The opposite result obtains looking the other way in the circuit at node e2. The voltage e3 across the primary of the transformer and e4 across the rectifier are shown also in FIGS. 6c and 6d. The voltage e4 is generated only when cores 1 or 2 saturate. Diodes D113a and D113b rectify the output signal from the secondary of transformer 112.

Figure 9A:
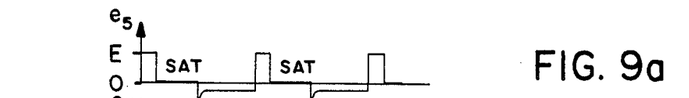
FIGS. 9a to 9g are waveforms illustrating signals produced at selected nodes in the circuit of FIG. 5.
Figures 9B, 9C:
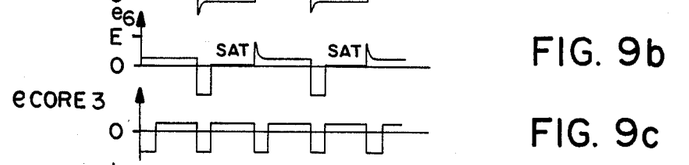

FIG. 9a represents the voltage e5. This voltage can be determined by subtracting the voltage from e2 during the time that switch S2 is closed and from the curve of FIG. 6b during the time switch S1 is closed.

e6 shown in FIG. 9b is acquired in the same way as e5 and is the symmetrical reverse of e5. FIG. 9c shows the voltage across the core 3 shown in FIG. 5 with plus and minus signs as shown in FIG. 5. This voltage is obtained by taking e4 and subtracting from it e0.

Figure 9D:
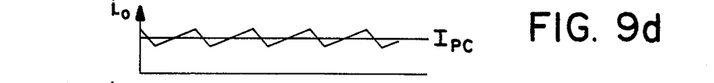

FIG. 9d represents the inductor current through core 3.

Figure 9E:
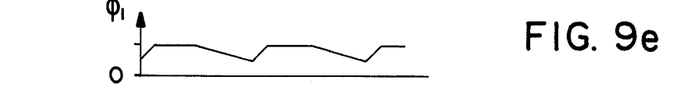
Figure 9F:
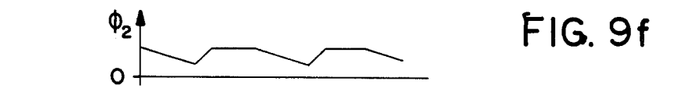
Figure 9G:
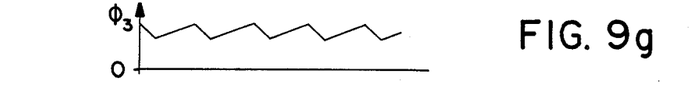

FIG. 9e represents the flux $\phi_1$ in core 1 while FIG. 9f represents the flux $\phi_2$ in core 2. FIG. 9g represents the flux $\phi_3$ in core 3. Thus the flux $\phi_1$ represents the integral of e5 with time since flux is the integral of voltage through the core over time. Flux $\phi_2$ represents the integral of e6 with time while flux $\phi_3$ represents the integral of the voltage across core 3 with time.

Figure 6A:
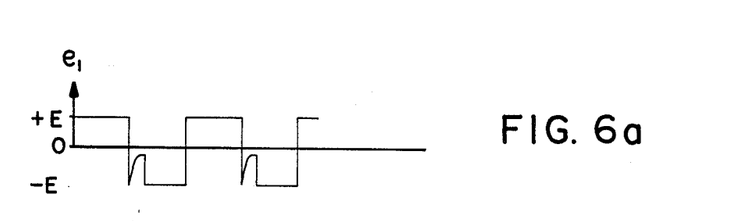
FIGS. 6a through 6d are waveforms of use in explaining the operation of the structure shown in FIG. 5.
Figure 6B:
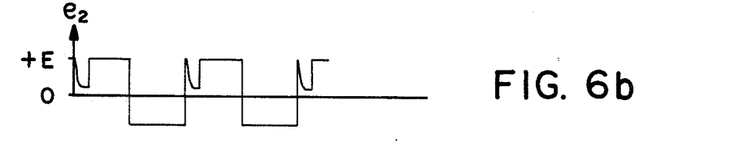
Figure 6C:
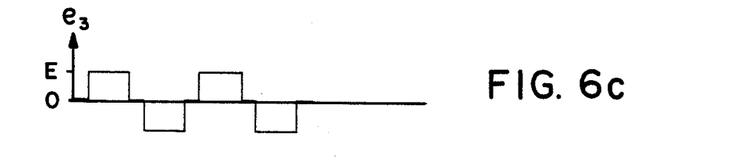
Figure 6D:
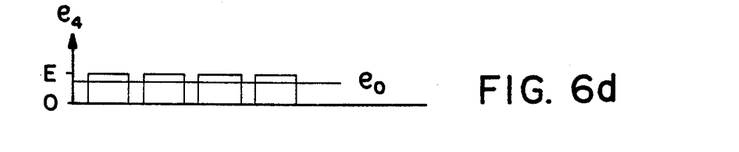

Turning back to FIGS. 6a and 6b, as a result of extra air inductance arising during the saturated condition associated with each core, a pulse is obtained in the waveforms of FIGS. 6a and 6b as shown. The pulse of node e5 (also $e_1$) of FIG. 6a is clipped at $-E$ by diode D20 (FIG. 5) and the pulse of node e6 (also $e_2$) of FIG. 6b is clipped at $+E$ by diode D21. Damping resistors can be used to smooth out certain of the signals if desired.

The structure of FIG. 5 provides for the return of this reactive power to the $+E$ and $-E$ buses through diodes, where the power is recycled and not dissipated. This construction requires a bifilar primary on the power transformer T1, to preserve the open circuit on core 1 when S1 is open and the open circuit on core 2 when S2 is open, which is important for low reactor drive current.

The inverter 300 shown in FIG. 4 is shown in more detail in FIG. 11. In FIG. 11, transistor 301a and transistor 301b are connected in series between the $+E$ and $-E$ voltage sources. This circuit is well known in the switching mode power supply arts as a half bridge circuit. The collector current passes through primary A and then passes through transistor 301a. The emitter of transistor 301a is connected to primary B in the collector current path of transistor 301b. The emitter of transistor 301b is connected to $-E$. In normal operation the voltage $+E$ results in a current through primary A of transformer T2 during the positive half cycle. This current generates a corresponding current in secondary A which drives the base emitter PN junction of transistor 301a thereby turning on transistor 301a. This circuit is called a proportional drive circuit because as the load current through primary A rises the transistor 301a is turned on by a corresponding rise in the base drive current through secondary A. The current through primary A likewise biases secondary B such that transistor 301b is driven off. After a period of time, typically 25 microseconds, core C4 (FIG. 11) saturates. Accordingly, the inductance L of the transformer T2 (FIG. 11) goes to zero causing the voltages in secondary A and primary A to go to zero. Also the voltages in primary B and secondary B are driven to zero. When these voltages go to zero, transistor 301a is turned off. The turning off of transistor 301a causes current to flow in secondary B after a short period of time. Once the charge carriers stored on the base emitter junction of transistor 301a have been swept away, the transistor 301b is turned on by the exciting current in the core which biases the base of transistor 301b positive relative to the emitter. Simultaneously the emitter voltage on transistor 301a drops toward $-E$. The primary B has a current drawn through it which provides a proportional base drive through secondary B to the base lead of transistor 310b. Transistor 310b therefore turns on. The core starts integrating flux in the other direction and in another 25 microseconds the core C4 thereby saturates in the opposite direction. The process repeates with transistor 301b thereby being turned off and transistor 301a being turned on.

Capacitors 505a and 505b define the zero reference voltage on the node between these two capacitors.

The connection from the secondary of transformer T1B through to the secondary B of transformer S2 insures that in the no load condition (no load is zero load current) sufficient ampere turns exist on core C4 that the circuit will work with no load current.

The capacitor 302a connected in parallel with two series connected diodes 303a and 304a in FIG. 11 acquires a charge equal to two voltage drops across two forward biased PN junctions of about 1.4 volts. When transistor 301a is turned off, capacitor 302a drives the base of transistor 301a negative by about 1.4 volts relative to its emitter thereby turning it off. When a voltage generated across secondary B is connected across the base to emitter junction of transistor 301b, an additional negative voltage is generated across secondary A. This negative voltage of about 2.1 volts further drives the base of transistor 301a negative relative to the emitter, further shutting off this transistor.

The output current to drive the load $R_L$ is coupled from the primary of T1B to the center tapped secondary winding of T1B shown in FIG. 4 and described above in conjunction with FIG. 1. While node 310 is conceptually shown as a connection in FIG. 11, it is to be understood that node 310 actually is formed by a plurality of diodes, as more fully shown in FIG. 3b.

Novelty of the circuit of FIG. 1 lies in the combination of the two saturable reactors 101 and 102 in combination with the inductor 114a. Switches S1 and S2 in the prior art were transistors controlled by a duty cycle modulator and drive circuitry. In the present invention, the switches S1 and S2 are still transistor switches. However, by using saturable cores 101 and 102, switches S1 and S2 comprise a simple inverter whose duty factor never has to vary. Rather the saturable cores 101 and 102 provide the variable duty factor by variations in the time to saturation in each half cycle during which a saturable core has current on the winding through it.

The use of diodes 531, 532 and 533 in the control section 600 (FIG. 4) results in a change in the number of windings on T3 and L1 active in the circuit in response to a voltage of a given magnitude or larger applied across nodes 606 and 605. When the voltage across these nodes becomes sufficiently large to forward bias diodes 531 and 532, the number of windings in T3 and L1 present in the circuit is reduced from a maximum number to a much smaller number, thereby allowing more volts per turn to be applied from a low voltage power supply. This increases the slew rate, but at the same time does not increase steady state power dissipation from the power supply.

By modulating the reference voltage across diode 35 (FIG. 4) the output voltage from the power supply across nodes 524 and 525 can be made AC instead of DC. Such an AC pulse sequence can be used to drive induction motors and put to other uses well known in the arts.

The invention has been described in conjunction with specific embodiments. However, those skilled in the art will be able to implement other embodiments incorporating the principles of this invention in view of the above disclosure.

I claim:

1. A switching mode power supply comprising:
   means for producing an output voltage having a controlled relationship to a dc input voltage applied across a positive terminal and a negative terminal;
   means for sensing a variation in the output voltage from a desired value;
   means for producing a control signal in response to said variation in said output voltage from a desired value;
   a first and a second saturable reactor means connected to receive said input voltage, said first saturable reactor means being arranged to receive a signal representing said input voltage on said positive terminal while said second saturable reactor means is disconnected from said negative terminal and said second saturable reactor means being arranged to receive a signal representing the negative of said input voltage on said negative terminal while said first saturable reactor means is disconnected from said positive terminal;
   means for switching so as to connect cyclically and repetitively said first saturable reactor means to said positive terminal while said second saturable reactor means is disconnected from said negative terminal and to connect said second saturable reactor means to said negative terminal while said first saturable reactor means is disconnected from said positive terminal;
   means for passing said control signal through said first saturable reactor means and said second saturable reactor means thereby to control the flux in said first saturable reactor means and second saturable reactor means at the beginning of the connection of said first saturable reactor means to said positive terminal and at the beginning of the connection of said second saturable reactor means to said negative terminal thereby to control the time necessary for said first saturable reactor means and said second saturable reactor means to saturate and thereby to control the time during which current is applied to the load of the structure and thus control the output voltage of the structure to a desired value;
   wherein said means for producing said control signal includes
   an inductor comprising a secondary winding on a core said core having a primary winding connected in series with a parallel connected load resistor and filter capacitor; and
   means for introducing a control voltage in series with both said secondary winding and said means for passing said control signal through said first saturable reactor means and said second saturable reactor means thereby to generate said control signal as the difference between said control voltage and the voltage on the secondary winding of said inductor, thereby to allow the initial flux in the first and second saturable core to be varied in response to a change in the current through the primary winding of said inductor.

2. A switching mode power supply as in claim 1 wherein said means for sensing a variation in the output voltage from a desired value and for producing said control signal in response to said variation comprises
   means for generating a measure of deviation in the output voltage from its desired value;
   means for generating a first signal representative of the deviation in the output voltage from its desired value; and
   means responsive to said first signal for generating said control voltage, said control voltage being representative of the integral of said first signal with respect to time.

3. A switching mode power supply as in claim 1 wherein said means for producing said control signal provides DC feedback for signals below 100 Hz together with AC feedback for signals above 100 Hz.

4. A switching mode power supply as in claim 1 wherein said means for introducing a control voltage in series with both said secondary winding and said means for passing causes any change in said control voltage to be integrated within one-half cycle of said means for switching to provide a change in the initial flux of the next one of said first saturable reactor means and said second saturable reactor means to be connected to its corresponding terminal thereby to apply through said inductor within the next half cycle of said means for switching the integral of said control voltage with time thereby to change the current through the primary winding of said inductor by an amount proportional to the volt seconds generated in said first saturable reactor means or said second saturable reactor means by said control voltage.

5. A switching mode power supply as in claim 4 wherein said means for introducing a control voltage causes the duty cycle of said first saturable reactor means and said second saturable reactor means to return to normal within one cycle of said means for switching following any change in the integral of said control voltage, thereby to obtain a stable, nonoscillatory change in output current from said switching mode power supply.

* * * * *

UNITED STATES PATENT AND TRADEMARK OFFICE
CERTIFICATE OF CORRECTION

PATENT NO. : 4,583,156
DATED : April 15, 1986
INVENTOR(S) : Charles O. Forge

It is certified that error appears in the above-identified patent and that said Letters Patent is hereby corrected as shown below:

```
Column 9,  line 10, "volt seconds" should read --volt-seconds--.
Column 9,  line 12, "volt seconds" should read --volt-seconds--.
Column 11, line 36, "116ia" should read --116a--.
Column 11, line 40, "switcing" should read --switching--.
Column 11, line 65, "D" should read --D6--.
Column 12, line 22, "D" should read --D6--.
Column 12, line 30, "D" should read --D6--.
Column 12, line 31, "101" should read --601--.
Column 12, line 52, "the connect" should read --to connect--.
Column 12, line 67, "102" should read --602--.
Column 15, line 8, before "1 and 2" insert --or cores--.
Column 15, line 18, "+E_0" should read --e_0--.
Column 15, line 32, after "e5" insert --in the structure
                    of Fig. 5--.
Column 16, line 39, "repeates" should read --repeats--.
Column 17, line 26, "35" should read --Z5--.
```

Signed and Sealed this

Nineteenth Day of August 1986

[SEAL]

Attest:

DONALD J. QUIGG

Attesting Officer

Commissioner of Patents and Trademarks